Feb. 3, 1970 C. M. HACKETT, JR 3,493,868
CARRIER RESTORATION MEANS FOR BINARY SIGNALS
Filed March 7, 1967

CHARLES MILTON HACKETT JR.
by
Henry W. Kaufmann,
Agent

United States Patent Office 3,493,868
Patented Feb. 3, 1970

3,493,868
CARRIER RESTORATION MEANS FOR BINARY SIGNALS

Charles Milton Hackett, Jr., Paoli, Pa., assignor to General Electric Company, a corporation of New York Filed Mar. 7, 1967, Ser. No. 621,161
Int. Cl. H04b *1/16*
U.S. Cl. 325—321 6 Claims

ABSTRACT OF THE DISCLOSURE

Replacement of carrier in "Manchester-type" binary signals is provided by band-pass filtering (or differentiating and low-pass filtering), and then full-wave rectifying incoming signals, applying to narrow-band filter (e.g. phase-locked loop) to produce output locked in frequency and phase to absent carrier. This output may be phase-shifted and shaped as required for application to conventional demodulator.

A presently known modulation scheme for the transmission of binary data is known as phase shift keying. In this modulation method, a fixed time interval is assigned to each binary digit or bit to be transmitted, and an alternating signal wave, which in practice is often a subcarrier employed to modulate the carrier of a radio transmitter, is so modulated that at the middle of the time interval assigned to a given bit, it passes through a zero value in the positive direction (i.e. from negative to positive) to indicate a first binary value (e.g. zero), and in the negative direction (from positive to negative) for the second binary value (one). Such signals are sometimes known as "Manchester-type" signals. Since the zero crossing, and its direction, are most accurately determinable when the subcarrier is a rectangular wave, approximately such a waveform is usually employed to improve the probability that the determination will be accurate despite the presence of noise signal superimposed on the modulated signal. For maximum economy of bandwidth, it is desirable that the fundamental period of the subcarrier be equal to the time interval assigned to each bit. However, as may be seen by reference to FIG. 1, the modulation scheme described produces, for a succession, of one's or zero's in succession, a modulated subcarrier which appears as a rectangular wave of double the fundamental frequency of the subcarrier. Such a modulated subcarrier contains zero crossings at the boundaries between successive bit intervals, these latter zero crossing being necessarily opposite in direction to that which signifies the bit value. In consequence of this fact, it is necessary to provide some time reference which will permit the demodulating or decoding device to identify the boundaries of the bit intervals in order that the non-significant zero crossings which occur there may be disregarded in the decoding process. This could, of course, be effected by transmitting the unmodulated subcarrier by another channel, but this is very wasteful of communication channels. It is therefore customary to attempt to derive from the modulated signal a phase reference which may be used in the decoding process.

One prior art method which has been used is that of Lindsey (W. C. Lindsey, "The Detection of PSK Signals With a Noisy Phase Reference," Proceedings of the 1965 National Telemetering Conference, pp. 50–52, Lewis Winner, New York, April 1965, L/C TK 399.N7). Lindsey, by filtering out unwanted signal components, passing the result through a squaring circuit, and applying the result to a phase-locked loop produces a signal which has a frequency double that of the subcarrier. By halving this frequency, he produces a reference signal which has the proper frequency to replace the unmodulated subcarrier as a phase reference. However, his scheme provides no way of assuring that this halved frequency is in phase, rather than half a cycle out of phase, with the original subcarrier. Consequently, his system may identify zero's as one's, and one's as zero's. Since it will do this consistently, it is possible by inserting in each series of significant bits some additional ones whose sole purpose is to indicate whether such an error is occurring; but this, too, is wasteful of bandwidth.

I have invented a method and apparatus which takes advantage of a statistical characteristic of the type of signal under consideration, which may be recognized by inspection of FIG. 1. It will be observed that there will *always* be a zero crossing at the center of each bit period; but where a zero is followed by a one, or a one by a zero, there is no zero crossing at the boundary between adjacent bit periods. Since, in practice, the object of transmitting information requires that at random times such sequences of one bit value followed by its opposite must occur, it is evident that the number of significant bit crossings will always be equal numerically to the number of bits transmitted, while the zero crossings at the boundaries between bit periods will be, statistically, less numerous. I therefore, by means to be described, derive a wave which has peaks corresponding to all the zero crossings. Because of the difference I have described in the average number of significant and insignificant (i.e. boundary) crossings, such a wave will have a fundamental component of the frequency of the original subcarrier fundamental, and in fixed phase relation to it; and the insignificant zero crossings will contribute harmonics only. By suitable circuitry, I derive from the peaked wave I have described a replacement for the original subcarrier which is in fixed and predetermined phase relation to the original subcarrier. This replacement may be applied to conventional demodulation apparatus to decode the modulated signals into bits unambiguously. As I have indicated, the transmission of a long continued series of one's or zero's would negate this; but, as has been explained, this case is not of practical importance, and would be remedied immediately by the beginning of transmission of significant data. It is also possible to select codes such that such an event could not occur.

Thus I achieve the object of providing a source of waveform fixed in frequency and phase with respect to the original subcarrier, useful for application to conventional demodulation apparatus to derive thereby the original binary data.

For the better understanding and explanation of my invention I have provided figures of drawing in which.

Figures 1, 2, 3, 4, 5, 6, 7:
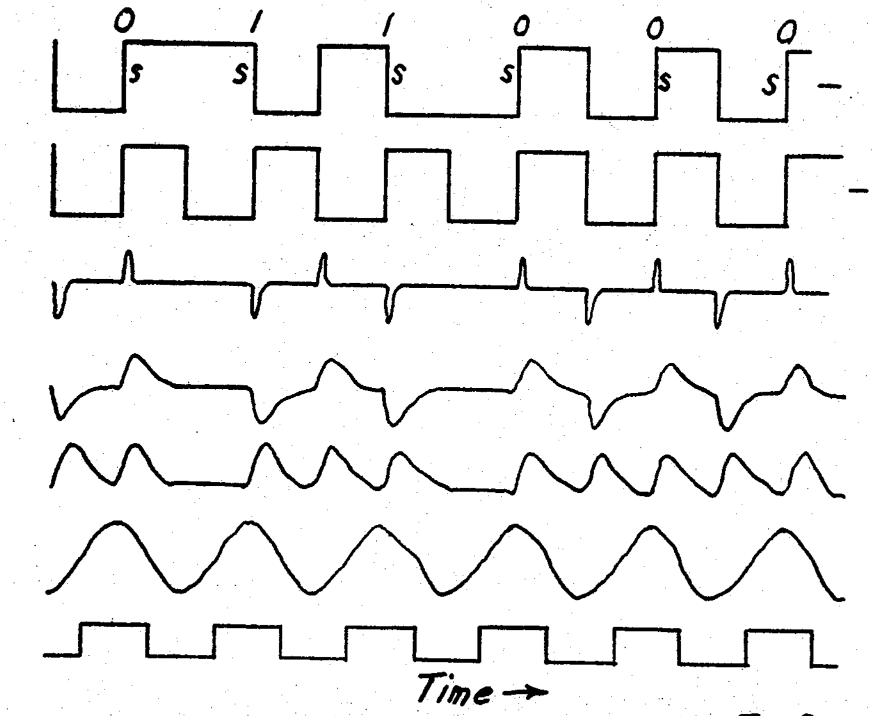
FIG. 1 represents an incoming modulated signal.
FIG. 2 represents an unmodulated subcarrier for which a replacement is to be obtained.
FIG. 3 represents the signal of FIG. 1 after differentiation.
FIG. 4 represents the signal of FIG. 3 after low pass filtering.
FIG. 5 represents the signal of FIG. 4 after passage through a nonlinear device such as a full-wave rectifier.
FIG. 6 represents the output produced by application of the signal of FIG. 5 to a narrowband filter, such as a phase-locked loop.
FIG. 7 represents an approximately rectangular wage form which may be obtained by limiting the amplitudes of the waveform of FIG. 6
Figure 8:
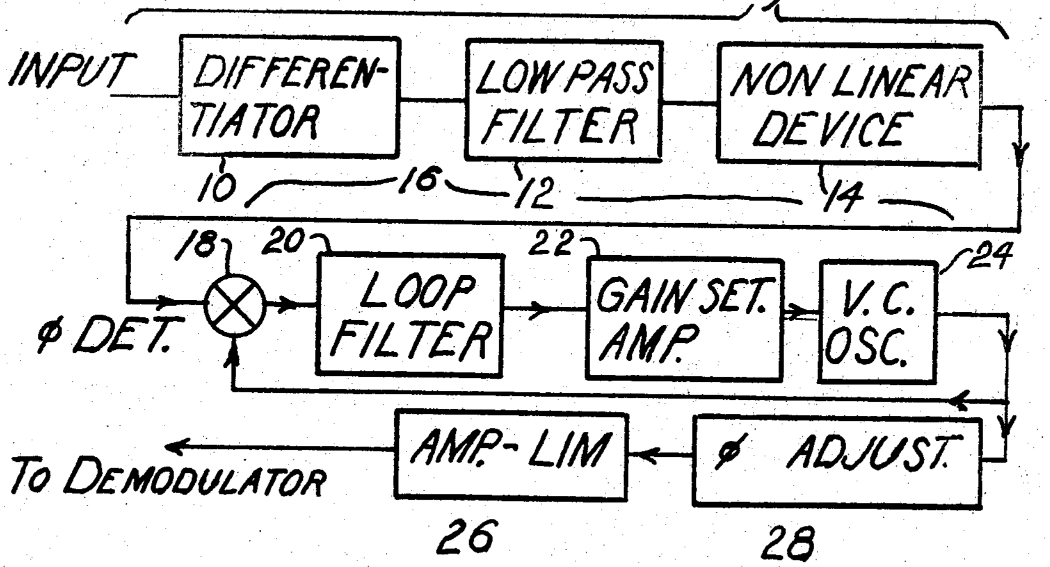
FIG. 8 represents as a block diagram of known elements an embodiment of my invention.

FIG. 8 represents in block diagram an embodiment of my invention, arrows indicating the direction of signal flow. The incoming signal (represented by FIG. 1) is applied to a differentiator 10, which accentuates the transitions from positive to negative values and vice versa appearing in FIG. 1, producing an output represented by FIG. 3. This output is applied to a low-pass filter 12, which is used to attenuate noise. The differentiator 10 tends to emphasize the high frequencies, and it is desirable to reduce somewhat the emphasis of high-frequency noise components which results from this. The actual upper pass frequency of low-pass filter 12 is not critical; its extreme lower limit would be a cut-off frequency at which the individual pips of FIG. 3 lost their identity. In practice, an upper cut-off frequency which produces somewhat of a "smearing," as is evident in FIG. 4 compared with FIG. 3, is satisfactory. Differentiator 10 and low-pass filter 12, in cascade comprise a band-pass filter, but have been shown as separate components to facilitate understanding of the operation of the system. However embodied, the output of the band-pass means is represented by FIG. 4. This output is applied to a nonlinear device 14, conveniently a conventional full-wave rectifier, which produces the output represented by FIG. 5. This output is applied to a narrow-band filter 16 which may most conveniently be a phase-locked loop of conventional design comprising a phase detector 18, loop filter 20, gain-setting amplifier 22, and voltage-controlled oscillator 24. In accordance with the known properties of phase-locked loop systems, oscillator 24 will lock in phase and frequency with the fundamental frequency appearing in FIG. 5. Since the oscillator 24 is so locked, its output will be that of FIG. 6. Since the oscillator has power gain, a part of such output may be applied to amplifier and limiter 26 to produce the output of FIG. 7, which will be seen to be identical with the original carrier represented by FIG. 2, but displaced therefrom in phase. Since the adjustment of the phase of approximately sinusoidal waveforms is easy and well known in the art, a phase shifter 28 is represented connected between the output connection of oscillator and amplifier-limiter 26 to permit adjustment of phase as may be required. The output of amplifier-limiter 26 may be applied to conventional demodulating equipment, as indicated in the figure.

A useful reference on the properties of phase-locked loops is "Principles of Coherent Communication," by Andrew J. Viterbi, published by McGraw-Hill Book Company, New York City, N.Y., 1966, L/C TK 5101V55.

It will be observed that the significant zero-crossings marked S in FIG. 1 are significant of the digital values indicated as "1" or "0," and are more numerous than the out-of-phase non-significant zero-crossings which result from the necessity of changing the sign of the signal so that its next significant zero-crossing may be in the required direction. These non-significant crossings survive filtering and rectification, as shown by FIGS. 4 and 5. Because they occur less frequently than the significant crossings, they contribute a component which is less in amplitude than the fundamental frequency component determined by the significant crossings. Since they also occur midway in time between the significant crossings, the smaller amplitude component they contribute is exactly out of phase with the component determined by the significant crossings. In consequence, the non-significant crossings simply subtract algebraically from the amplitude of the desired fundamental frequency component, without altering its phase as they would do if they were not in exact phase opposition to it.

What is claimed is:

1. A device for supplying a phase reference signal for decoding binary signals in which a first binary value is signified by a transition from negative to a positive amplitude of the signal and a second binary value is signified by a transition from a positive to a negative amplitude of said signal, the said significant transitions occurring at equal intervals of time, other non-significant transitions also sometimes occurring at other times, comprising:

band-pass means adapted to receive the said binary signals as an input and selectively transmit frequency components thereof to produce output signals in which the amplitude of the said transitions is accentuated, relatively to other portions of the said binary signals, connected to receive the said binary signals and transmit them as recited to nonlinear means adapted to receive the signals transmitted by the said band-pass means and to produce an output containing even harmonics thereof, connected to receive the signals transmitted by the said band-pass means and to produce an output which is transmitted to narrow-band filter means adapted to receive the said output from the said nonlinear means and to produce an output containing as its largest component one having a period equal to the said interval of time and in substantially fixed phase with respect to the said significant transitions.

2. In a device for supplying a phase reference signal for decoding binaary signals in which a first binary value is signified by a transition from negative to positive amplitude of the signal and a second binary value is signified by a transition from a positive to a negative amplitude of the said signal, the said significant transitions occurring at equal intervals of time, other non-significant transitions also sometimes occurring at other times, comprising:

band-pass means adapted to receive the said binary signals as an input and selectvely transmit frequency components thereof to produce output signals in which the amplitude of the said transitions is accentuated, relatively to other portions of the said binary signals, connected to receive the said binary signals and transmit them as recited to nonlinear means adapted to receive the signals transmitted by the said band-pass means and to produce an output containing even harmonics thereof, connected to receive the signals transmitted by the said band-pass means and to produce an output which is transmitted to narrow-band filter means adapted to receive the said output from the said nonlinear means and to produce an output containing at its largest component one having a period equal to the said interval of time and in substantially fixed phase with respect to the said significant transitions; the improvement that the therein said band-pass means comprise:

differentiating means adapted to receive input signals and produced therefrom differentiated output signals, connected to receive the said binary signals and produce therefrom differentiated output signals and transmit them to low-pass filter means adapted to transmit the differentiated signal components representative of the said transitions and to attenuate higher-frequency noise, connected to receive the said differentiated output signals and to transmit them to the said nonlinear means.

3. In a device for supplying a phase reference signal for decoding binary signals in which a first binary value is signified by a transition from negative to a positive amplitude of the signal and a second binary value is signified by a transition from a positive to a negative amplitude of the said signal, the said significant transitions occurring at equal intervals of time, other non-significant transitions occurring at other times, comprising:

band-pass means adapted to receive the said binary signals as an input and selectively transmit frequency components thereof to produce output signals in which the amplitude of the said transitions is accentuated, relatively to other portions of the said binary signals, connected to receive the said binary signals and transmit them as recited to nonlinear means adapted to receive the signals transmitted by the said band-pass means and to produce an output containing even harmonics thereof, connected to receive the signals transmitted by the said band-pass means and to produce an output which is transmitted to narrow-band filter means adapted to receive the said output from the said nonlinear means and to produce an output containing as its largest component one having a period equal to the said interval of time and in substantially fixed phase with respect to the said significant transitions; the improvement that phase adjusting means are provided to adjust the said substantially fixed phase.

4. In a device for supplying a phase reference signal for decoding binary signals in which a first binary value is signified by a transition from negative to a positive amplitude of the signal and a second binary value is signified by a transition from a positive to a negative amplitude of the said signal, the said significant transitions occurring at equal intervals of time, other non-significant transitions also sometimes occurring at other times, comprising:

band-pass means adapted to receive the said binary signals as an input and selectively transmit frequency components thereof to produce output signals in which the amplitude of the said transitions is accentuated relatively to other portions of said binary signals, connected to receive the said binary signals and transmit them as recited to nonlinear means adapted to receive the signals transmitted by the said band-pass means and to produce an output containing even harmonics thereof, connected to receive the signals transmitted by the said band-pass means and to produce an output which is transmitted to narrow-band filter means adapted to receive the said output from the said nonlinear means and to produce an output containing as its largest component one having a period equal to the said interval of time and in substantially fixed phase with respect to the said significant transitions; the improvement that said nonlinear means comprises a full wave rectifier.

5. In a device for supplying a phase reference signal for decoding binary signals in which a first binary value is signified by a transition from negative to a positive amplitude of the signal and a second binary value is signified by a transition from a positive to a negative amplitude of the said signal, the said significant transitions occurring at equal intervals of time, other non-significant transitions also sometimes occurring at other times, comprising:

band-pass means adapted to receive said binary signals as an input and selectively transmit frequency components thereof to produce output signals in which the amplitude of the said transitions is accentuated, relatively to other portions of the said binary signals, connected to receive the said binary signals and transmit them as recited to nonlinear means adapted to receive the signals transmitted by the said band-pass means and to produce an output containing even harmonics thereof, connected to receive the signals transmitted by the said band-pass means and to produce an output which is transmitted to narrow-band filter means adapted to receive the said output from the said nonlinear means and to produce an output containing as its largest component one having a period equal to the said interval of time and in substantially fixed phase with respect to the said significant transitions; the improvement that the said narrow band filter means comprise means having gain, from which last said means an output signal is provided.

6. In a device for supplying a phase reference signal for decoding binary signals in which a first binary value is signified by a transition from negative to a positive amplitude of the signal and a second binary value is signified by a transition from a positive to a negative amplitude of the said signal, the said significant transitions occurring at equal intervals of time, other non-significant transitions also sometimes occurring at other times, comprising:

band-pass means adapted to receive the said binary signals as an input and selectively transmit frequency components thereof to produce output signals in which the amplitude of the said transitions is accentuated, relatively to other portions of the said binary signals, connected to receive the said binary signals and transmit them as recited to nonlinear means adapted to receive the signals transmitted by the said band-pass means and to produce an output containing even harmonics thereof, connected to receive the signals transmitted by the said band-pass means and to produce on output which is transmitted to narrow-band filter means adapted to receive said output from the said nonlinear means and to produce an output containing as its largest component one having a period equal to the said interval of time and in substantially fixed phase with respect to the said significant transitions; the improvement that the said narrow band filter means comprises a phase locked loop.

References Cited

UNITED STATES PATENTS

| | | | |
|---|---|---|---|
| 3,156,893 | 11/1964 | Harel | 178—67 |
| 3,209,268 | 9/1965 | Fraunfelder et al. | |
| 3,243,580 | 3/1966 | Welsh. | |
| 3,265,813 | 8/1966 | McFarlane et al. | 325—320 |
| 3,376,511 | 4/1968 | Brothman et al. | 178—88 |

ROBERT L. GRIFFIN, Primary Examiner

JAMES A. BRODSKY, Assistant Examiner

U.S. Cl. X.R.

178—67, 88; 325—38; 340—174.1

PO-1050
(5/69)

UNITED STATES PATENT OFFICE
CERTIFICATE OF CORRECTION

Patent No. 3,493,868 Dated February 3, 1970

Inventor(s) Charles Milton Hackett, Jr.

It is certified that error appears in the above-identified patent and that said Letters Patent are hereby corrected as shown below:

Column 4, line 39, change "at" to -- as --

SIGNED AND
SEALED
JUN 23 1970

(SEAL)
Attest:

Edward M. Fletcher, Jr.
Attesting Officer

WILLIAM E. SCHUYLER, JR.
Commissioner of Patents